US008929471B2

(12) United States Patent
Hewavithana et al.

(10) Patent No.: US 8,929,471 B2
(45) Date of Patent: Jan. 6, 2015

(54) METHODS AND SYSTEMS TO MITIGATE IMPULSE INTERFERENCE

(71) Applicant: Intel Corporation, Santa Clara, CA (US)

(72) Inventors: Thushara Hewavithana, Hatfield (GB); Bernard Arambepola, Enfield (GB); Sahan Gamage, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 13/661,817

(22) Filed: Oct. 26, 2012

(65) Prior Publication Data

US 2014/0119420 A1     May 1, 2014

(51) Int. Cl.
    *H04L 5/12*        (2006.01)
    *H04L 23/02*     (2006.01)

(52) U.S. Cl.
    USPC ........................................................ 375/261

(58) Field of Classification Search
    USPC ........................................................ 375/261
    See application file for complete search history.

(56) References Cited

U.S. PATENT DOCUMENTS

| | | |
|---|---|---|
| 2007/0030931 A1 | 2/2007 | Arambepola |
| 2009/0257540 A1 | 10/2009 | Tan |
| 2010/0166115 A1 | 7/2010 | Hewavithana et al. |
| 2012/0051471 A1 | 3/2012 | Hewavithana et al. |

FOREIGN PATENT DOCUMENTS

EP        2161840 A2     3/2010

OTHER PUBLICATIONS

Sanchez, M.G. ; de Haro, L. ; Ramon, M.C. ; Mansilla, A. ; Ortega, C.M. ; Oliver, D., "Impulsive Noise Measurements and Characterization in a UHF Digital TV Channel," IEEE Transactions on Electromagnetic Compatibility, vol. 41, No. 2, pp. 124-136 (May 1999).*
Zogakis, T.N. ; Chow, P.S. ; Aslanis, J.T. ; Cioffi, J.M., "Impulse Noise Mitigation Strategies for Multicarrier Modulation," Proceedings of the International Conference on Communications (ICC), vol. 3, pp. 784-788 (May 23, 1993).*
Sedarat, J. ; Miller, B. ; Fisher, K., "Impulse Noise Protection for Multi-Carrier Communication Systems," IEEE International Conference on Acoustics, Speech, and Signal Processing, 2005, ICASSP '05, Proceedings, vol. 3, pp. iii/853-iii/856.*
International Search Report and Written Opinion received for PCT Patent Application No. PCT/US2013/047348, mailed on Oct. 16, 2013, 9 pages.

* cited by examiner

*Primary Examiner* — Shuwang Liu
*Assistant Examiner* — Nader Bolourchi
(74) *Attorney, Agent, or Firm* — Garrett IP, LLC (57) ABSTRACT

Methods and systems to mitigate impulse interference in an OFDM QAM signal. A per-symbol noise measure, or quality measure (QM) is computed for a symbol k as a MSE of distances between carriers in the symbol and points of corresponding QAM constellations. MSE(k) is averaged over multiple symbols to compute a background signal QM, AVG_MSE(k). If MSE(k) exceeds AVG_MSE(k) by a moderate amount, symbol k may be moderately affected by impulse interference, and per-carrier SNR estimates are downgraded for all data carriers in symbol k, prior to LLR computation. SNR downgrading may be linear or step-wise based on an extent to which MSE(k) exceeds AVG_MSE(k). If MSE(k) exceeds AVG_MSE(k) by a significant amount, symbol k may be significantly affected by impulse interference, and LLRs may be set to indicate that all data carriers are erased in symbol k.

38 Claims, 8 Drawing Sheets

METHODS AND SYSTEMS TO MITIGATE IMPULSE INTERFERENCE

BACKGROUND

Concatenated codes are a class of error-correcting codes that combine an inner code and an outer code to provide exponentially decreasing error probability with increasing block length and polynomial-time decoding complexity.

Conventional cable networks include coaxial cable and/or a combination of optic fiber and coaxial cable, the latter of which may be referred to as a hybrid fiber-coaxial (HFC) network.

A cable network may experience sporadic impulse interference, or noise bursts, which may occur at average rate in a range of approximately 10 Hz. Noise bursts durations may be in a range of approximately 20 micro-seconds (µs), which is sufficient to affect one or more symbols of a multi-carrier signal, such as a signal modulated with orthogonal frequency division multiplexing (OFDM). Conventional cable systems utilize single carrier quadrature amplitude modulation (QAM) modulation, which is less affected by impulse noise than a multi-carrier signal, such as signal modulated with OFDM.

Conventional cable systems utilize a concatenated forward error correction (FEC) codes, including a trellis inner code and a Reed-Solomon (RS) outer code.

Conventional cable receivers mitigate impulse noise, or noise bursts, by de-interleaving between trellis decoding and RS decoding. This may not be practical for non-concatenated codes, such as a low-density parity-check (LDPC) code.

In the drawings, the leftmost digit(s) of a reference number identifies the drawing in which the reference number first appears.

DETAILED DESCRIPTION

Methods and systems are disclosed herein to mitigate burst noise, also referred to impulse interference.

The methods and systems may be implemented in combination with non-concatenated forward error correction (FEC), such as low-density parity-check (LDPC).

A non-concatenated FEC code, such as LDPC, may provide increase receiver gain relatively substantially compared to a concatenated FEC code. The increased gain may permit higher date rates.

Methods and systems disclosed herein may be implemented with one or more of a variety of QAM-based modulation techniques, including multi-carrier modulation technique, such as orthogonal frequency division multiplexing (OFDM) and/or other multi-carrier modulation techniques, single carrier (SC) QAM systems with frequency domain equalization (SC-FDE), and/or SC QAM systems with frequency division multiplexing (SC-FDM).

Each point of a $2^n$ QAM constellation represents n-bits. For example, a 64-QAM constellation includes $2^6$=64 points, and each of the 64 points represents a unique set of 6-bits.

Each constellation point may be associated with a unique phase and amplitude, and the n bits of a constellation point may be conveyed by modulating a carrier signal with the phase and amplitude of the constellation point. The n bits may be referred to as bits carried in a constellation point of a data carrier or, equivalently, bits carried in a data carrier constellation point.

Under ideal conditions, a set of n bits carried in a data carrier constellation point may be demodulated based on the phase and amplitude of the carrier. In practice, a log likelihood ratio (LLR) may be computed for each of the n bits to indicate the likelihood that the corresponding bit is logic 1 or logic 0. For a 64 QAM carrier, LLRs are computed for 6 bits. The LLRs may be referred to as soft values or soft decisions. The LLRs may be processed with forward error correction (FEC), as described further below with reference to FIG. 6.

Methods and systems disclosed herein may be implemented in one or more of a variety of communication systems including, without limitation, cable systems including HFC cable systems, and may be implemented in a physical layer of a network, such as a hybrid fiber-coaxial (HFC) network.

Methods and systems are disclosed herein with respect to OFDM and LDPC, for illustrative purposes. Methods and systems disclosed herein are not, however, limited to OFDM or LDPC.

Figure 1:
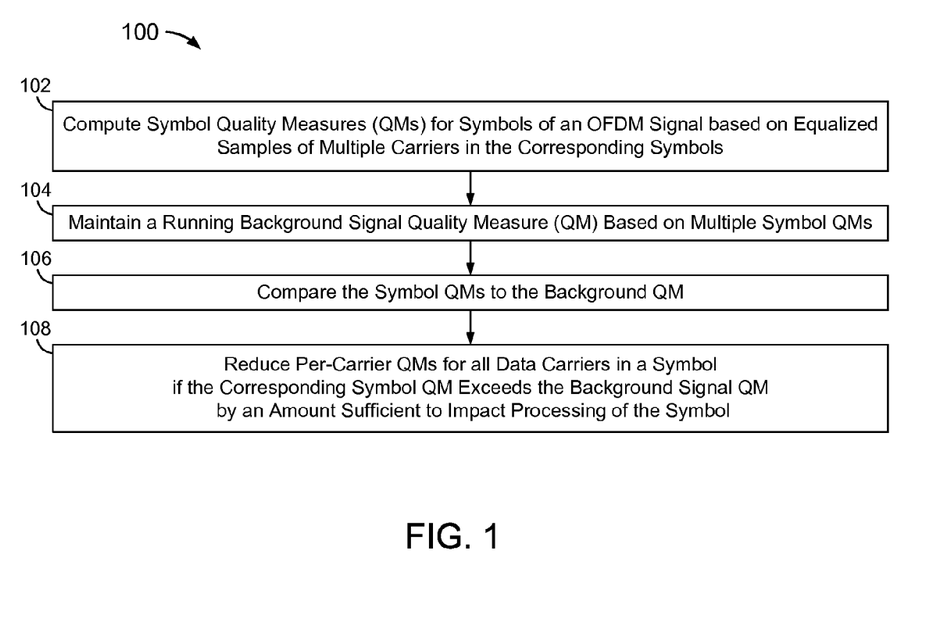
FIG. 1 is a flowchart of a method of mitigating impulse interference across all data carriers of a signal, on a per-symbol basis.

FIG. 1 is a flowchart of a method 100 of mitigating impulse interference across all data carriers of a signal, on a per-symbol basis. Method 100 is described below with reference FIG. 2. Method 100 is not, however, limited to the example of FIG. 2.

Figure 2:
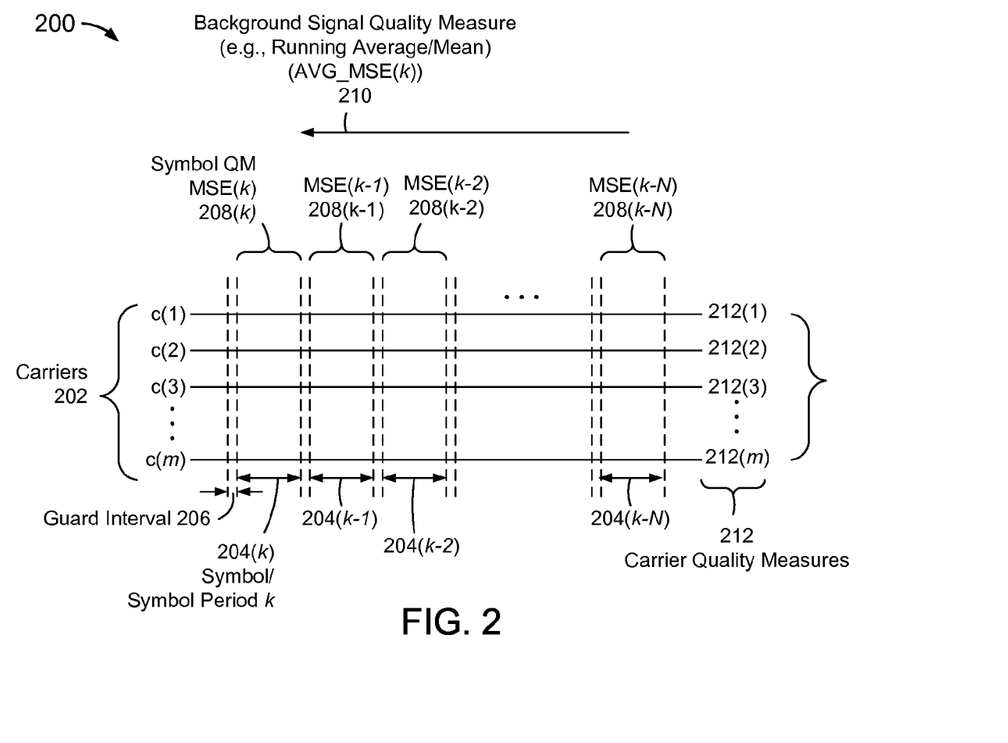
FIG. 2 is a depiction of an OFDM signal including carriers c(1) through c(m).

FIG. 2 is a depiction of an OFDM signal 200 including carriers 202, also denoted as c(1) through c(m).

Signal 200 includes symbol periods or symbols 204, which may be separated by guard intervals 206.

Carriers 202, or a subset thereof, have associated carrier quality measures (carrier QMs) 212, also referred to herein as per-carrier QMs. Carrier QMs 212 may include a relatively long-term signal quality measure, such as a long-term signal-to-noise ratio (SNR) estimate, which may be based on variances in corresponding channel estimates observed over multiple symbols.

At 102 in FIG. 1, symbol quality measures (symbol QMs) 208 are computed for symbols 204 of signal 200. Symbol QMs 208 may also be referred to as per-symbol QMs.

Each symbol QM 208 may be computed from equalized samples of one or more of carriers 202 within the corresponding symbol 204. For example, symbol QM 208(k) may be computed from one or more of carriers c(1) through c(m), in symbol 204(k).

Symbol QMs 208 may be determined based on a difference or error measure of the carrier(s), which may be indicative of a noise level. Symbol QM 208(k) may be determined, for example, based on distances between the carriers and points in corresponding QAM constellations. For a data carrier, distance may be determined with respect to a constellation point nearest to the equalized sample. For a pilot carrier, the distance may be determined with respect to a known constellation point associated with the pilot carrier.

QM 208(k) may be computed as an average or mean of squared distances computed for multiple carriers in symbol 204(k). QM 208(k) may be computed as a mean squared error, MSE(k), which may be expressed as:

$$MSE(k) = \frac{\sum_{i \in S}(x(i) - p(i))^2}{L} \quad \text{EQ. (1)}$$

where x(i) represents a position of an $i^{th}$ carrier in a symbol;
p(i) represents a constellation point;
S represents a set of carriers for which distance are computed in symbol k; and
L is the number of carriers over which MSE(k) is computed.

S may include all pilot and data carriers of signal 200, or a subset thereof. For example, where a subset of carriers 202 is characterized as relatively noisy, the subset of carriers may be excluded from S.

S may include a combination of pilot carriers and data carriers, or may be restricted to pilot carriers or data carriers.

In examples below, a symbol QM 208 may be referred to as MSE(k) for illustrative purposes. Unless otherwise specified herein, a reference to MSE(k) is not limited to a MSE.

At 104 in FIG. 1, a background signal quality measure (background QM) 210 is determined based on multiple symbol QMs 208. Background QM 210 may be computed and/or maintained as a running average or mean over multiple symbols or symbol periods 204, and may be represented as AVG_MSE(k).

Background QM 210 may be computed and/or maintained non-recursively over N symbols, such as in EQ. (2) below, or with recursive averaging, such as in EQ. (3) below.

$$AVG\_MSE(k) = AVG\_MSE(k-1) + \frac{MSE(k) - MSE(k-N)}{N} \quad \text{EQ. (2)}$$

$$AVG\_MSE(k) = (1 - \alpha)AVG\_MSE(k-1) + \alpha MSE(k); \quad \text{EQ. (3)}$$
$$0 < \alpha < 1.$$

Recursive averaging modifies a prior value and thus requires little or no storage.

Non-recursive averaging may be performed over a rectangular sliding window of symbols, in which each symbol has equal weight. Alternatively, non-recursive averaging may be performed over a non-rectangular sliding window of symbols, in which weighting varies by symbol position within the window. A non-rectangular sliding window may utilize a combination of rectangular and non-rectangular weighting. Non-rectangular weighting may include, for example, exponential weighting.

In examples below, background QM 210 may be referred to as AVG_MSE(k) for illustrative purposes. Unless otherwise specified herein, a reference to AVG_MSE(k) is not limited to a MSE.

As described above, background QM 210 is thus a single overall quality measure, averaged over multiple symbols and over multiple carriers. Whereas each carrier QM 212 is single quality measure for a single carrier, computed or estimated over multiple symbols 204. And whereas a symbol QM 208 is a quality measure of a single symbol 204, which may be averaged over multiple carriers.

As described below, background QM 210 and symbol QMs 208 are used to identify symbols 204 that are impacted by burst noise. Burst noise is then mitigated with respect to the individual symbols 204 by downgrading the carrier QMs 212 for all carriers in the symbol, or by setting LLR values to indicate the every bit of that carrier is an erasure. Downgrading of carrier QMs 212 in the symbol and/or erasing carriers 212 in the symbol may reduce an impact of burst noise in the symbol during downstream FEC.

As an example, a noise burst may last for approximately 20 μs, and a symbol or symbol period 204 may be in a range of 80 μs. The noise burst may thus affect as few as 1 or two symbols 204. Specifically, the noise burst may cause the symbol QMs 208 of the 1 or two symbols 204 to exceed background QM 210 by an amount sufficient to impact accuracy and/or reliability of downstream forward error correction (FEC).

At 106 in FIG. 1, symbol QMs 208 are compared to background QM 210 to identify symbol QMs 208 that exceed background QM 210 by an amount sufficient to impact downstream decoding of the corresponding symbol 204, which may be due to a noise burst. In FIG. 2, MSE(k) may be compared to AVG_MSE(k).

At 108, for each symbol QM 208 identified at 106, burst noise is mitigated with respect to the corresponding symbol 204 by downgrading carrier QMs 212 for all carriers in the symbol 204, or by setting LLR values of carriers 212 to indicate the every bit of each carrier is an erasure in the symbol. In FIG. 2, carrier QMs 212 may be downgraded in symbol 204(k) if MSE(k) sufficiently exceeds AVG_MSE(k).

Carrier QMs 212 may be downgraded by a predetermined amount or factor. Alternatively, carrier QMs 212 may be downgraded based an extent to which a symbol QM 208 exceeds background signal QM 210, and may be downgraded in proportion to the extent to which the symbol QM 208 exceeds background signal QM 210.

Proportional downgrading scheme given in equation (4) below is the optimal way to downgrade the carrier QMs when Where the burst noise behaves like additive white Gaussian Noise (AWGN) in a carrier (i.e. frequency) domain, carrier QMs 212 may be proportionally downgraded for symbol 204(k) as in EQ. (4):

$$QM(i, k) = QM(i, k)\frac{AVG\_MSE(k)}{MSE(k)} \quad \text{EQ. (4)}$$

where QM(i,k) is the carrier QM of carrier i in symbol k.

Carrier QMs 212 may be downgraded linearly, step-wise, exponentially, and/or combinations thereof. Carrier QMs 212 may be downgraded to an extent at which the carriers are essentially erased in symbol k.

Carrier QMs 212 may be expressly erased by setting LLR values as described below.

As an example, at 106, MSE(k) may be compared to multiple thresholds, which may vary with variations in AVG_MSE(k). At 108, long-term SNR estimates for all data carriers within carriers 212 may be downgraded for symbol 204(k) when MSE(k) is between first and second thresholds. If, however, MSE(k) exceeds the second threshold, LLRs may be set to erase carriers 212 in symbol 204(k).

Additional examples of carrier QM downgrading and setting LLRs to erase carriers in a symbol are provided further below with reference to FIG. 3.

Method 100 may be implemented as described below with reference to FIG. 3.

Figure 3:
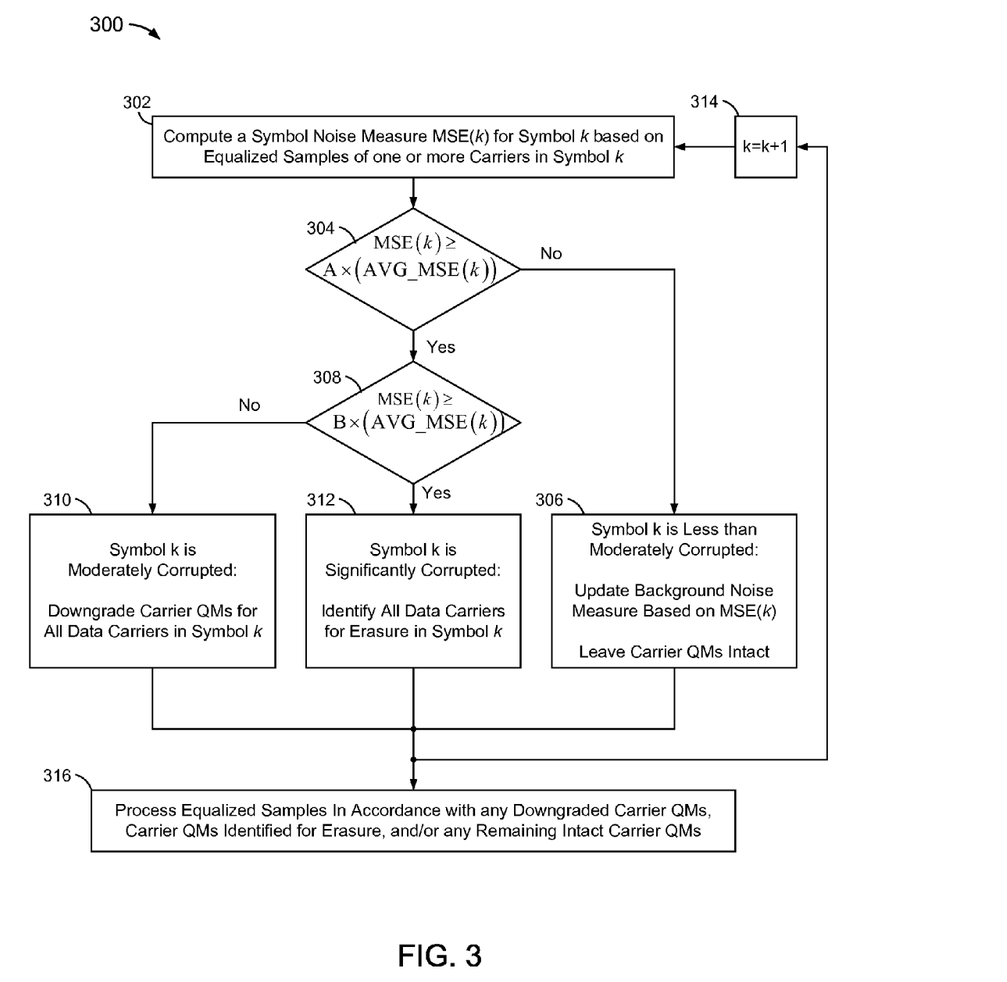
FIG. 3 is a flowchart of another method of mitigating burst noise or impulse interference across all data carriers, on a per-symbol basis.

FIG. 3 is a flowchart of a method 300 of mitigating burst noise or impulse interference across all data carriers, on a per-symbol basis. Method 300 is described below with reference FIG. 2. Method 300 is not, however, limited to the example of FIG. 2.

At 302, a symbol noise measure is computed for a symbol k based on equalized samples of one or more carriers in symbol k. The symbol noise measure may be based on squared distances, such as described above with respect to 102 in FIG. 1. In FIG. 2, MSE(k) is computed for symbol 104(k).

At 304, MSE(k) is compared to a first threshold that varies based on variations in a background noise level. The first threshold may be defined or computed as a product of a background noise level and a multiplier, referred to herein as a first threshold factor. At 304, the background noise level is illustrated as AVG_MSE(k), and the multiplier is illustrated as "A." The first threshold may also be referred to as a lower threshold or a moderate threshold.

If MSE(k) is less than the first threshold at 304, symbol k may be considered less than moderately corrupted and, at 306, carrier QMs are left intact in symbol k.

Also at 306, since MSE(k) is less than moderately corrupted, a decision may be made to update AVG_MSE(k) with MSE(k). The decision may be based on the first threshold as illustrated at 304, or may be based on one or more other thresholds. Selectively updating AVG_MSE(k) depending upon a noise measure of MSE(k) may help to prevent contamination of AVG_MSE(k) by noise bursts.

At 304, if MSE(k) is equal to or greater than the first threshold, carrier QMs of all data carriers may be downgraded in symbol k, or LLR values may be set to erase all data carriers in symbol k, the such as described further above.

In FIG. 3, and a second threshold is used at 308 to select between degrading of carrier QMs during a symbol at 310, and identifying carriers for express erasure at 312.

At 308, MSE(k) is compared to a second threshold that is greater than the first threshold, and that also varies with variations in the background noise level. The second threshold may be defined or computed as a product of the background noise level and a multiplier, referred to herein as a second threshold factor. At 308, the background noise is illustrated as AVG_MSE(k), and the multiplier is illustrated as "B." The second threshold may also be referred to as a higher threshold, and upper threshold, or an excessive noise threshold.

If MSE(k) is less than the second threshold at 308, MSE(k) is, by definition, equal to the first threshold or between the first and second thresholds, and symbol k may be considered moderately corrupted.

At 310, when symbol k is considered moderately corrupted, all data carriers are down-graded in symbol k.

At 308, if MSE(k) is at least equal to the second threshold at 308, MSE(k) may be considered significantly corrupted and, at 312, all data carriers are identified for erasure in symbol k.

At 314, k is incremented to evaluate a subsequent symbol.

At 316, the equalized samples are processed in accordance with carrier QMs left intact at 306, carrier QMs downgraded at 310, and/or carrier QMs identified for erasure at 312.

Figure 4:
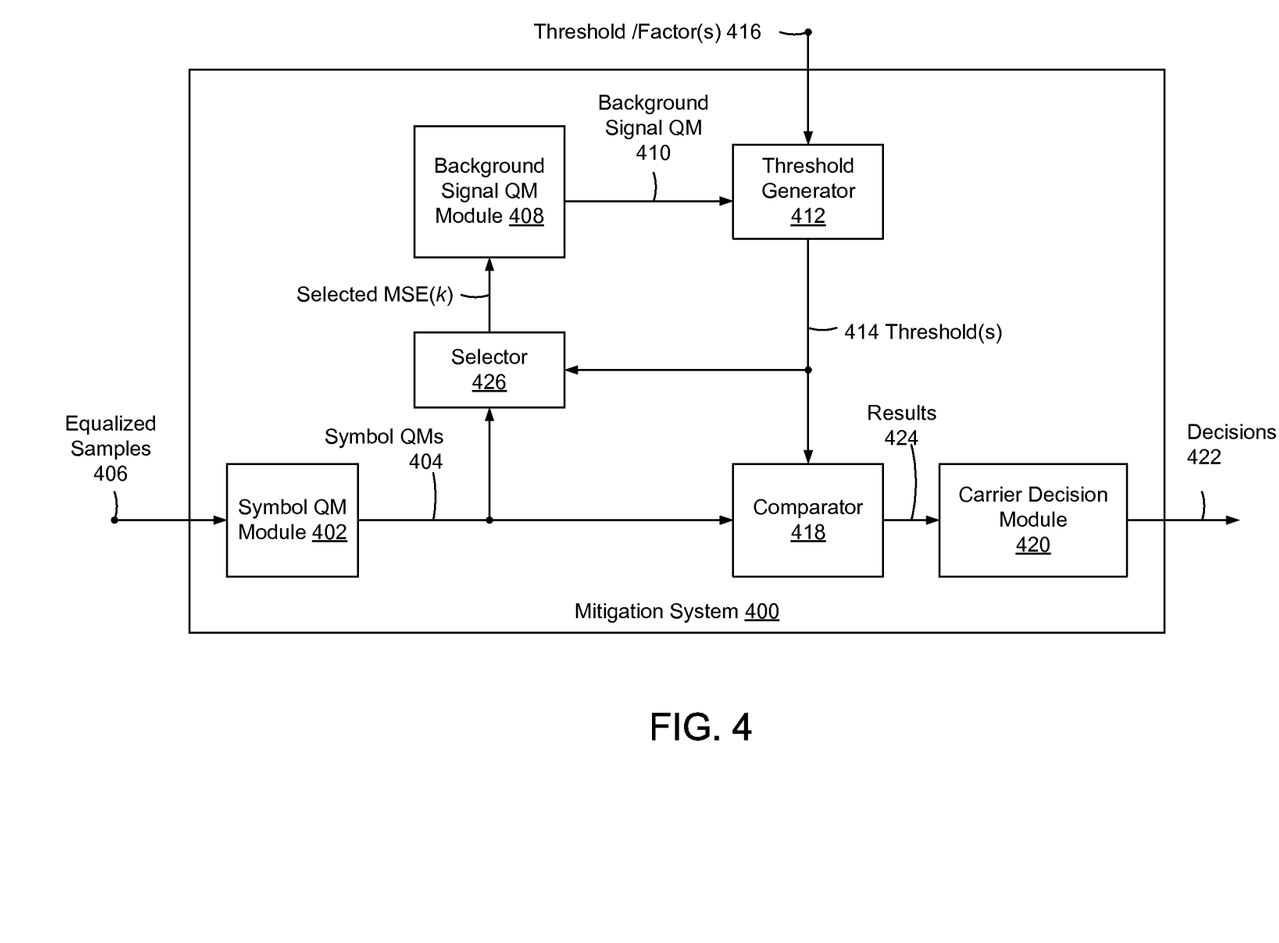
FIG. 4 is a block diagram of a mitigation system to mitigate burst noise across all data carriers of a signal, on a per-symbol basis.

FIG. 4 is a block diagram of a mitigation system 400 to mitigate burst noise across all data carriers of a signal, on a per-symbol basis. System 400 is described below with references to examples above. System 400 is not, however, limited to the examples above.

System 400 includes a symbol QM module 402 to compute symbol QMs 404 based on equalized samples 406, such as described above with reference to 102 and/or 302.

System 400 further includes a background signal QM module 408 to compute a background signal QM 410 based on symbol QMs 404, such as described above with reference to 104.

System 400 further includes a threshold generator 412 to generate one or more thresholds 414 based on background signal QM 410 and one or more multipliers or threshold factors 416, such as described above with reference to 108, 304, and/or 308.

System 400 further includes a comparator 418 to evaluate signal QMs 404 based on threshold(s) 414, such as described above with reference to 106, 108, 304, and/or 308.

System 400 further includes a carrier decision module 420 to provide decisions 422 regarding carriers in a symbol based on comparison results 424, such as described above with reference to 108, 306, 310, and/or 312.

System 400 may include a selector 426 to select or omit a symbol QM 404 from background QM 410 based on a threshold 414, such as described above with reference to 306.

Figure 5:
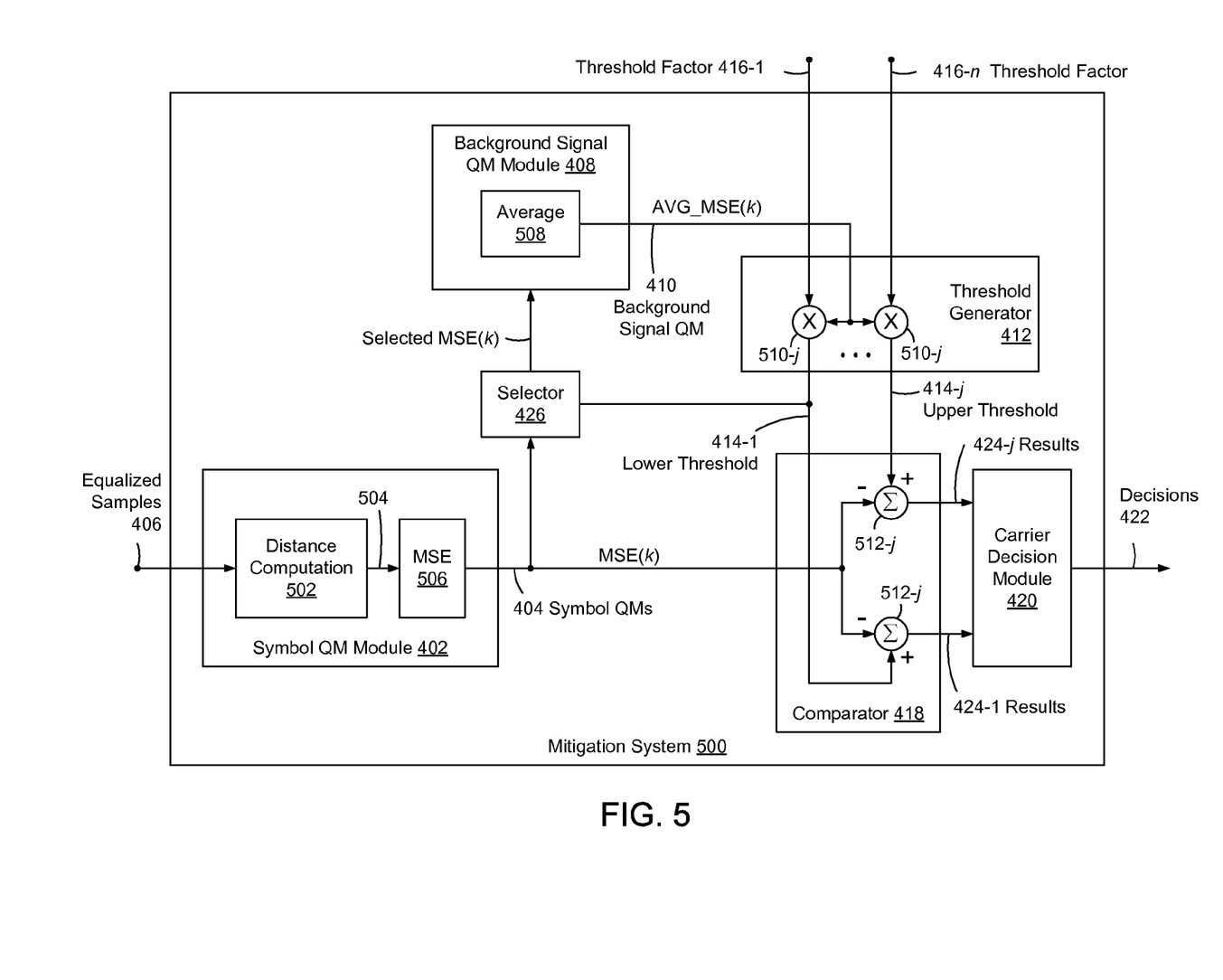
FIG. 5 is a block diagram of a system, including example implementations of aspects of the mitigation system of FIG. 4.

FIG. 5 is a block diagram of a system 500, including example implementations of modules of system 400.

In FIG. 5, symbol QM module 202 includes a distance computation module 502 to compute a noise measure 504 for each of one or more carriers in a symbol k, each based on a distance between the corresponding carrier and a QAM constellation point, such as described above with reference to 102.

QM module 202 further includes a MSE module 506 to compute symbol QMs 404 as MSE(k), based on noise measures 504, such as described above with reference to EQ. (1).

In FIG. 5, background signal module 408 includes a averaging module 508 to compute background signal QM 410 as AVG_MSE(k), such as described above with reference to EQS. (2) and (3).

In FIG. 5, threshold generator 412 includes multipliers 510-1 through 510-j, each to generate a corresponding one of thresholds 414-1 through 414-j as a product of AVG_MSE(k) and a corresponding multiplier or threshold factor 416-1 through 416-j.

Threshold 414-1 is illustrated here as a lower threshold, which may correspond to the first threshold at 304 in FIG. 3. Threshold 414-j is illustrated here as an upper threshold, which may correspond to the second threshold at 308 in FIG. 3. Threshold 414-1 may be greater than threshold 414-j. One or more other thresholds 414 may be less than or greater than threshold 414-1 and/or threshold 414-j.

In FIG. 5, comparator 418 includes comparators 512-1 through 512-j, each to compare symbol MSE(k) to a corresponding one of thresholds 414, and to provide a corresponding result 424 to carrier decision module 420.

A system such as described above with reference to FIG. 4 and/or FIG. 5 may be implemented in a receiver system, such as described below with reference to FIG. 6.

Figure 6:
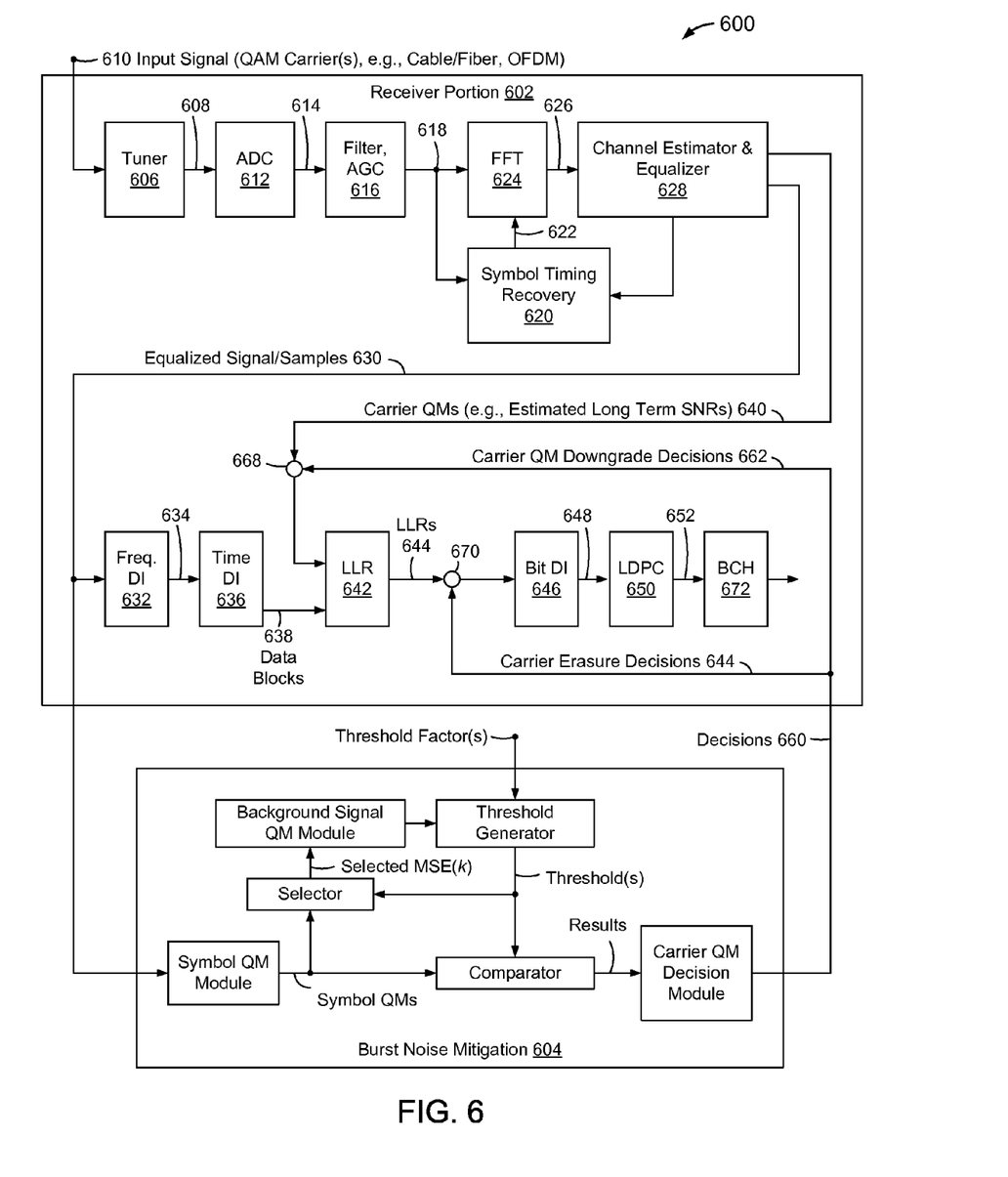
FIG. 6 is a block diagram of a system, including a receiver and a burst noise or impulse interference mitigation system.

FIG. 6 is a block diagram of a system 600, including a receiver 602 and a burst noise mitigation system 604. Burst noise mitigation system 604 may be configured as described above with reference to noise mitigation system 400 and/or 500.

Receiver 602 includes a tuner 606 to select and sample a channel of an input 610 signal. Input signal 610 may be received over cable and/or fibre. The selected channel may include an OFDM signal.

Receiver 602 further includes an analog-to-digital converter (ADC) 612 to digitize samples 608 of the selected channel.

Receiver 602 further includes filter and automatic gain control module, illustrated together at 616, to remove adjacent and unwanted out-of-band signals from digitized samples 614.

Receiver 602 may include phase locked loops to recover clock and frequency data.

Receiver 602 further includes a Fast Fourier Transform (FFT) module 624 to convert samples 618 to a frequency domain.

Receiver 602 further includes a symbol timing recovery portion 620 to generate a FFT trigger 622 for FFT module 624.

Receiver 602 further includes a channel estimator and equalizer, illustrated together at 628, to estimate channels for carriers of the OFDM signal from corresponding frequency domain samples 626, and to equalize frequency domain samples 626.

The OFDM signal may include pilot tones modulated with known modulation (e.g., BPSK or QPSK), and known pseudo-random sequences. The pilot tones may be used for clock and frequency synchronization, channel estimation, and/or equalization.

Channel estimator and equalizer 628 may also estimate carrier quality measures (QMs) 640 for data carriers. Carrier QMs 640 may include an estimated long-term noise measure for each data carrier of the OFDM signal, such as a long-term SNR estimate. Long-term SNR may be estimated for a carrier based on variances in corresponding channel estimates observed over many symbols.

Receiver 602 further includes a frequency de-interleaver 632 to de-interleave or randomize carrier ordering, and a time de-interleaver 636 to disperse randomized carriers 634 of a symbol k amongst LDPC data blocks 638. Time de-interleaver 636 may include a convolutional de-interleaver or a block de-interleaver. A convolutional de-interleaver may utilize memory relatively efficiently.

Frequency and time de-interleaving may be performed with respect to all data carriers of the ODFM signal, excluding pilot carriers.

As described further above, a carrier may be modulated with a phase and amplitude of a constellation point to convey n bits associated with the constellation point, and LLRs may be computed for the n bits.

In FIG. 6, receiver 602 includes a LLR module 642 to compute LLRs 644 for n bits of each data carrier in a symbol k. LLRs 644 may be computed based on the dispersed, randomized carriers in data blocks 838, and carrier QMs described below.

Receiver 602 further includes a bit de-interleaver 646 to de-interleave bits of LLRs 644 as LLR estimates 648.

Receiver 602 further includes a FEC module, illustrated here as a low-density parity-code (LDPC) decoder 650, to decode bits 652 from LLR estimates 648 based on carrier QMs, such as the long-term per-carrier SNR estimates.

Performance of LDPC decoder 650 depends on the quality of LLR estimates 648. Burst noise may result in degraded LLR estimates 648 for affected symbols.

Mitigation system 604 is configured to generate decisions 660, illustrated here as including carrier QM downgrade decisions 662 and carrier erasure decisions 664, such as described in one or more examples above.

Receiver 602 includes a module 668 to downgrade carrier QMs in a symbol k, in accordance with decisions 662.

Receiver 602 further includes a module 670 to set LLRs 644 to effectively erase all carriers in a symbol k, in accordance with decisions 660.

Downgrading of carrier QMs and/or setting LLR values as described herein may help LDPC decoder 650 to optimally recover data bits from symbols impacted by burst noise.

Frequency de-interleaver 632 and time de-interleaver 636 may disperse carriers of symbols over a sufficient number of LDPC data blocks 638, such that none of the data block include more than a relatively small number of carriers to be downgraded or erased in any given symbol.

Modules 668 and 670 may leave carriers intact during symbol k when decisions 660 do not include a downgrade decision 662 or an erasure decision 644 for symbol k.

Receiver 602 may include a BCH code module 672 to correct errors in bits 652.

Methods and systems disclosed herein may be implemented in hardware, firmware, a computer system, a machine, and combinations thereof, including discrete and integrated circuitry, application specific integrated circuits (ASICs), and/or microcontrollers, and may be implemented as part of a domain-specific integrated circuit package or system-on-a-chip (SOC), and/or a combination of integrated circuit packages.

Figure 7:
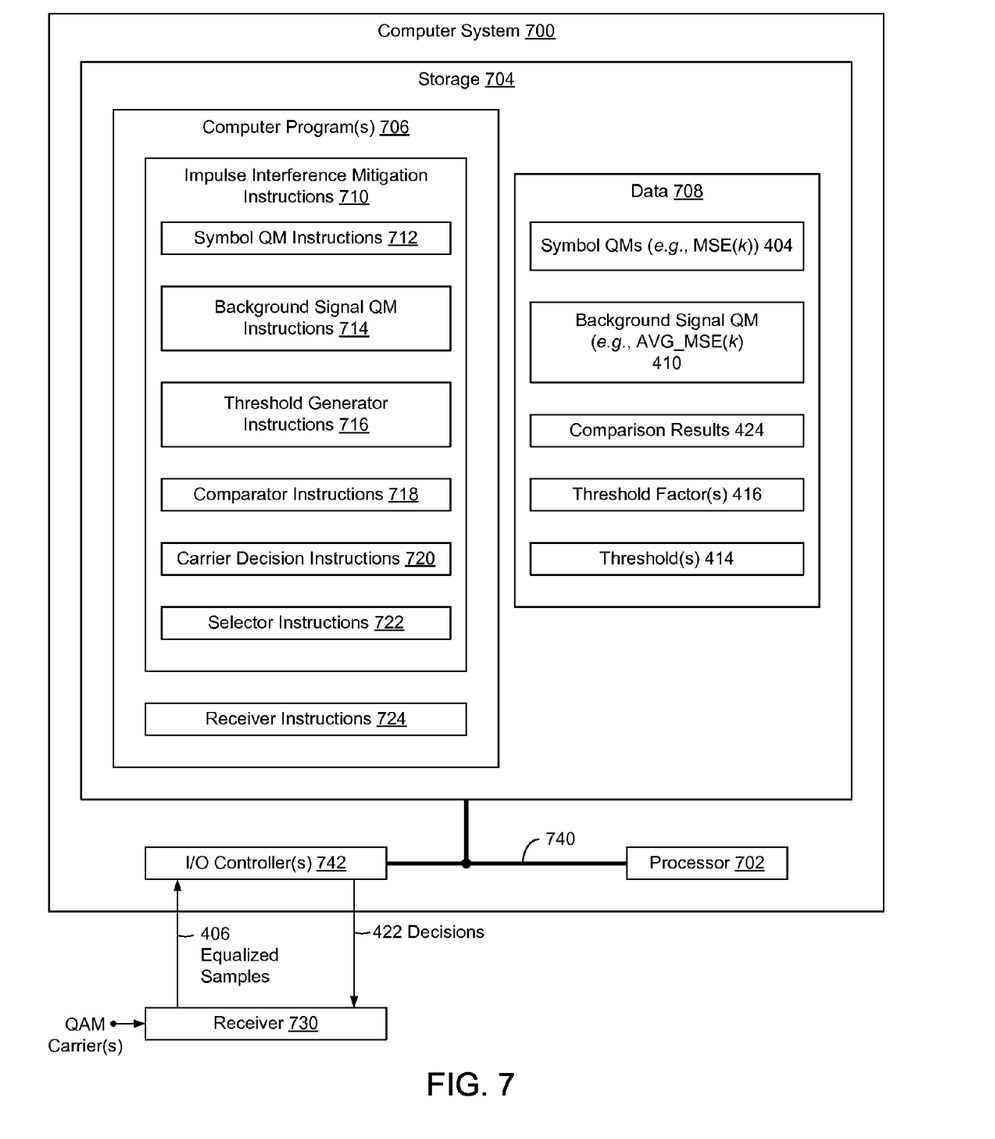
FIG. 7 is a block diagram of a computer system configured to mitigate impulse interference in a receiver.

FIG. 7 is a block diagram of a computer system 700, configured to mitigate impulse interference in a receiver. Computer system 700 is described below with reference to FIG. 4. Computer system 700 is not, however, limited to the example of FIG. 4.

Computer system 700 includes one or more computer instruction processor units and/or processor cores, illustrated here as a processor 702, to execute instructions of a computer program. Processor 702 may include a general purpose instruction processor, a controller, a microcontroller, or other instruction-based processor.

Computer system 700 further includes storage 704 to hold computer program(s) 706 and data 708.

Computer program(s) 704 include instructions to cause processor 702 to execute or perform a process or procedure, such as described further below. Computer program 706 may also be referred to as software, computer program logic, and/or machine readable logic. Computer program 706 may encoded within a computer readable medium, which may include a non-transitory medium.

Data 708 may include data to be used by processor 702 during execution of computer program(s) 706, and/or generated by processor 702 when executing computer program(s) 706.

Storage 704 may include one or more types of storage described below with reference to FIG. 8.

Figure 8:
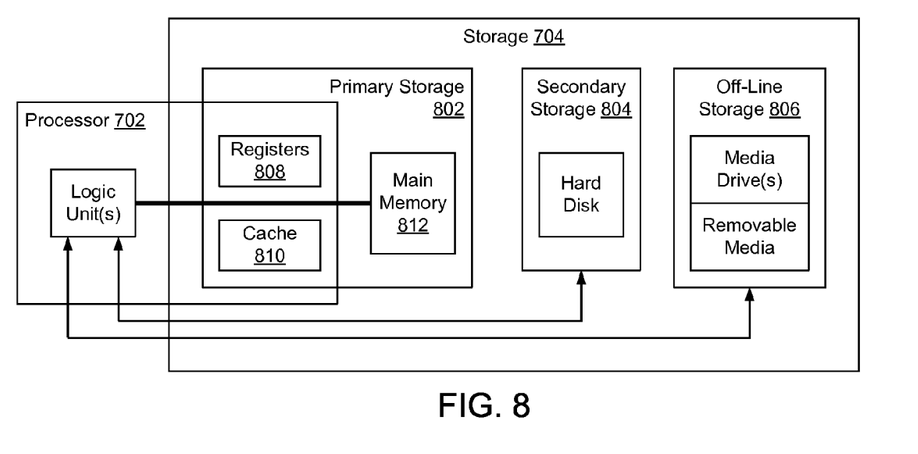
FIG. 8 is a block diagram of a processor and storage of FIG. 7, where the storage includes primary storage, secondary storage, and off-line storage.

FIG. 8 is a block diagram of processor 702 and storage 704, where storage 704 includes primary storage 802, secondary storage 804, and off-line storage 806.

Primary storage 802 includes registers 808, processor cache 810, and main memory or system memory 806. Registers 808 and cache 810 may be directly accessible by processor 702. Main memory 806 may be accessible to processor 702 directly and/or indirectly through a memory bus. Primary storage 802 may include volatile memory such as random-access memory (RAM) and variations thereof including, without limitation, static RAM (SRAM) and/or dynamic RAM (DRAM).

Secondary storage 804 may be indirectly accessible to processor 702 through an input/output (I/O) channel, and may include non-volatile memory such as read-only memory (ROM) and variations thereof including, without limitation, programmable ROM (PROM), erasable PROM (EPROM), and electrically erasable PROM (EEPROM). Non-volatile memory may also include non-volatile RAM (NVRAM) such as flash memory. Secondary storage 804 may be configured as a mass storage device, such as a hard disk or hard drive, a flash memory drive, stick, or key, a floppy disk, and/or a zip drive.

Off-line storage 806 may include a physical device driver and an associated removable storage medium, such as an optical disc.

In FIG. 7, computer program(s) 706 include impulse interference mitigation (mitigation) instructions 710 to cause processor 702 to evaluate equalized samples 406 for impulse interference, and to compute decisions 422 to mitigate phase noise in one or more of the equalized samples, such as described in one or more examples herein.

Mitigation instructions 710 include symbol QM instructions 712 to cause processor 702 to compute symbol QMs 404, which may include MSE(k), such as described in one or more examples herein.

Mitigation instructions 710 further include background signal QM instructions 714 to cause processor 702 to compute background signal QMs 410, which may include AVG_MSE(k), such as described in one or more examples herein.

Mitigation instructions 710 further include threshold generator instructions 716 to cause processor 702 to compute one or more thresholds 414 based on background signal QM 410 and one or more corresponding threshold factor(s) 416, such as described in one or more examples herein.

Mitigation instructions 710 further include comparator instructions 718 to cause processor 702 to compare symbol QMs 404 to the one or more thresholds 414, such as described in one or more examples herein.

Mitigation instructions 710 further include carrier decision instructions 720 to cause processor 702 to provide decisions 422 based on comparison results 424, such as described in one or more examples herein.

For example, receiver 730 may compute per-carrier quality measures (carrier QMs), such as long-term SNRs, and a decision 422 may include a decision to downgrade the carrier QMs for all data carriers in a symbol, such as described in one or more examples herein Alternatively, or additionally, receiver 730 may compute LLRs, such as described further above, and a decision 422 may include a decision to set the LLRs to identify all data carriers of as erased within a symbol, such as described in one or more examples herein.

Computer system 700 may include communications infrastructure 740 to communicate amongst devices and/or resources of computer system 700.

Computer system 700 may include one or more input/output (I/O) devices and/or controllers 742 to communicate with one or more other systems, such as to communicate with receiver 730.

In an embodiment, computer program 706 further includes receiver instructions 724 to cause processor 702 to implement one or more features of receiver 730, which may include one or more features of receiver 602 in FIG. 2.

Methods and systems disclosed herein may be implemented with respect to one or more of a variety of systems, such as described below with reference to FIG. 9. Methods and systems disclosed herein are not, however, limited to the examples of FIG. 9.

Figure 9:
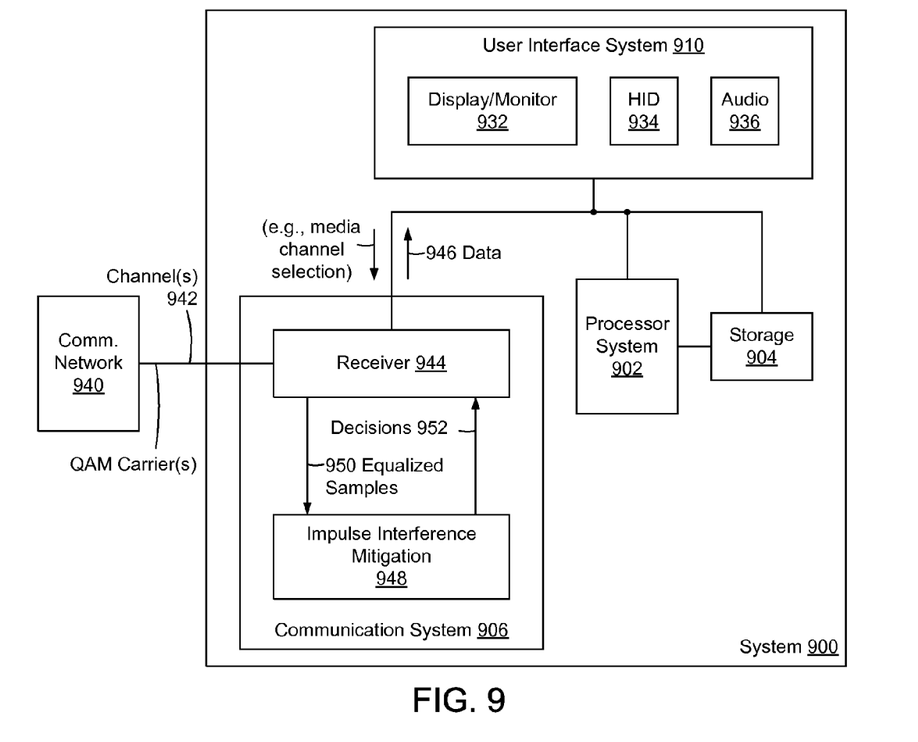
FIG. 9 is a block diagram of a system, including a processor, memory/storage, a user interface, and a communication system that includes an impulse interference mitigation system.

FIG. 9 is a block diagram of a system 900, including a processor system 902, memory or storage 904, a user interface system 910, and a communication system 906 to interface between an external communication system or network 940, and processor system 902 and/or user interface system 910.

Communication system 906 may be configured to receive signals from communication network 940 over a channel 942, which may include a cable, an optic fibre, and/or a wireless link.

Communication system 906 may be configured to receive multiple selectable signals OFDM signal over channel 942.

Communication system 940 may include, without limitation, a media content provider to provide media to system 900. Communication system 940 may include, for example, a cable television provider.

Communication system 906 includes a receiver 944 to demodulate and decode data 946 from signals received over channel(s) 942. Receiver 944 may be configured as described above with reference to receiver 602 in FIG. 6.

Communication system 906 further includes an impulse interference mitigation system 948 receiver 944 to provide mitigation decisions 952 based on equalized samples 950, such as described in one or more examples herein.

Storage 904 may include one or more features described above with respect to FIG. 8, and may be accessible to processor system 902, communication system 906, and/or user interface system 910.

User interface system 910 may include a monitor or display 932 and/or a human interface device (HID) 934. HID 934 may include, without limitation, a key board, a cursor device, a media presentation controller (e.g., a TV remote control), a touch-sensitive device, a motion and/or image sensor, a physical device and/or a virtual device, such as a monitor-displayed virtual keyboard. User interface system 910 may include an audio system 936, which may include a microphone and/or a speaker.

System 900 may include a housing such as, without limitation, a rack-mountable housing, a desk-top housing, a lap-top housing, a notebook housing, a net-book housing, a tablet housing, a telephone housing, a set-top box housing, and/or other conventional housing and/or future-developed housing. Processor system 902, storage 904, communication system 906, user interface system 910, and/or portions thereof, may be positioned within the housing.

System 900 or portions thereof may be implemented within one or more integrated circuit dies, and may be implemented as a system-on-a-chip (SoC).

As disclosed herein, a method or process of mitigating impulse interference may include:

determining symbol quality measures for a symbol of a signal based on equalized samples of one or more carriers of the symbol;

determining a running background signal quality measure based on symbol quality measures of multiple symbols; and generating a first control to downgrade carrier quality measures of each of one or more data carriers in the symbol if the symbol quality measure exceeds a first threshold that varies with variations in the background signal quality.

The method may further include:

determining distances between carriers in the symbol and points of corresponding QAM constellations;

determining the symbol quality measure as a MSE of the distances; and determining the background signal quality measure as an average of symbol quality measures of the multiple symbols.

The method may include updating the background signal quality measure with the symbol quality measure if the symbol quality measure is below the first threshold.

The method may include determining an amount by which to downgrade the carrier quality measures based on an extent to which the symbol quality measure exceeds the first threshold. The method may include determining the amount on a linear scale and/or selecting one of multiple downgrade increments.

The carrier quality measures include an estimated signal-to-noise ratio (SNR) for each data carrier, and the method may include generating the first control to downgrade the SNRs of all data carriers in the symbol if the symbol quality measure exceeds the first threshold. The method may further include:
  estimating log-likelihood ratios (LLRs) for bits carried in constellation points of the data carriers, for multiple symbols, based on the corresponding SNRs;
  forward error correcting (FEC) the estimated LLRs; and
  downgrading the estimated SNRs of all data carriers in the symbol based on the first control, prior to the estimating LLRs.

The FEC may include low-density parity checking (LDPC).

The method may include generating a second control to identify all data carriers in the symbol for erasure if the symbol quality measure exceeds a second threshold that varies with variations in the background signal quality measure. The second threshold is higher than the first threshold. The method may further include:
  estimating log-likelihood ratios (LLR) for bits carried in constellation points of the data carriers, for multiple symbols, based on the corresponding SNRs;
  forward error correcting (FEC) the estimated LLRs; and
  setting estimated LLRs of identified data carriers to indicate that the identified data carriers are erased in the symbol based on the second control and prior to the FEC.

The FEC may include low-density parity checking (LDPC).

The carrier quality measures may include an estimated signal-to-noise ratio (SNR) for each data carrier, and the method may further include:
  generating the first control to downgrade the SNRs of all data carriers in the symbol if the corresponding symbol quality measure exceeds the first threshold; and
  generating a second control to set estimated LLRs of all data carriers in the symbol to indicate that all of the data carriers are erased in the symbol, if the corresponding symbol quality measure exceeds a second threshold that varies with variations in the background signal quality measure, wherein the second threshold is higher than the first threshold.

Means for performing a method as described above are disclosed in examples herein.

System, machines, and computer system are disclosed herein to implement a method as described above. For example, and without limitation, a computer readable or machine readable storage medium may be encoded with a computer program, program code, instructions, or software which, when executed, cause a machine or processor to perform functions described above.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A machine-implemented method of mitigating impulse interference in quadrature amplitude modulated (QAM) carriers, comprising:
  receiving equalized samples of the QAM carriers from a receiver;
  determining a symbol quality measure for a symbol based on equalized samples of at least one of the carriers in the symbol;
  determining a running background signal quality measure based on symbol quality measures determined for multiple symbols;
  generating a first control to downgrade carrier quality measures of all data carriers in the symbol if the symbol quality measure exceeds a first threshold that varies with variations in the background signal quality measure; and
  providing the first control to the receiver.

2. The method of claim 1, wherein the determining a symbol quality measure includes:
  determining the symbol quality measure based on equalized samples of multiple carriers in the symbol.

3. The method of claim 1, further including:
  determining distances between carriers in the symbol and points of corresponding quadrature amplitude modulated constellations;
  wherein the determining a symbol quality measure includes determining the symbol quality measure as a mean squared error of the distances; and
  wherein the determining a running background signal quality measure includes determining the running background signal quality measure as an average of the symbol quality measures of the multiple symbols.

4. The method of claim 1, further including:
  updating the running background signal quality measure with the symbol quality measure if the symbol quality measure is below the first threshold.

5. The method of claim 1, further including:
  determining an amount by which to downgrade the carrier quality measures based on an extent to which the symbol quality measure exceeds the first threshold.

6. The method of claim 5, wherein the determining an amount includes determining the amount on a linear scale.

7. The method of claim 5, wherein the determining an amount includes selecting one of multiple downgrade increments.

8. The method of claim 1, wherein the carrier quality measures include an estimated signal-to-noise ratio (SNR) for each data carrier, and wherein the generating includes:
  generating the first control to downgrade the SNRs of all data carriers in the symbol if the symbol quality measure exceeds the first threshold.

9. The method of claim 8, further including, at the receiver:
  estimating log-likelihood ratios (LLRs) for bits carried in constellation points of the data carriers, for multiple symbols, based on the corresponding SNRs;
  forward error correcting (FEC) the estimated LLRs; and downgrading the estimated SNRs of all data carriers in the symbol prior to the estimating LLRs, based on the first control.

10. The method of claim 9, wherein the FEC includes low-density parity checking (LDPC).

11. The method of claim 1, further including:
generating a second control to identify all data carriers in the symbol for erasure if the symbol quality measure exceeds a second threshold that varies with variations in the background signal quality measure, wherein the second threshold is higher than the first threshold.

12. The method of claim 11, wherein the carrier quality measures include an estimated signal-to-noise ratio (SNR) for each data carrier, the method further including, at the receiver:
estimating log-likelihood ratios (LLR) for bits carried in constellation points of the data carriers, for multiple symbols, based on the corresponding SNRs;
forward error correcting (FEC) the estimated LLRs; and
setting estimated LLRs of identified data carriers to indicate that the identified data carriers are erased in the symbol, prior to the FEC, based on the second control.

13. The method of claim 12, wherein the FEC includes low-density parity checking (LDPC).

14. The method of claim 1, wherein the carrier quality measures include an estimated signal-to-noise ratio (SNR) for each data carrier, and wherein the generating includes:
generating the first control to downgrade the SNRs of all data carriers in the symbol if the corresponding symbol quality measure exceeds the first threshold; and
generating a second control to set estimated LLRs of all data carriers in the symbol to indicate that all of the data carriers are erased in the symbol if the corresponding symbol quality measure exceeds a second threshold that varies with variations in the background signal quality measure, wherein the second threshold is higher than the first threshold.

15. A system to mitigate impulse interference in quadrature amplitude modulated (QAM) carriers, comprising:
an input to receive equalized samples of the QAM carriers from a receiver;
a symbol quality module to determine a symbol quality measure for a symbol based on equalized samples of at least one of the carriers in the symbol;
a background signal quality module to determine a running background signal quality measure based on symbol quality measures determined for multiple symbols;
a decision module to generate a first control to downgrade carrier quality measures of all data carriers in the symbol if the symbol quality measure exceeds a first threshold that varies with variations in the background signal quality measure; and
an output to provide the first control to the receiver.

16. The system of claim 15, wherein the symbol quality module is configured to determine the symbol quality measure based on equalized samples of multiple carriers in the symbol.

17. The system of claim 15, wherein:
the symbol quality module is configured to determine distances between carriers in the symbol and points of corresponding quadrature amplitude modulated constellations, and to determine the symbol quality measure as a mean squared error of the distances; and
the background signal quality module is configured to determine the running background signal quality measure as an average of the symbol quality measures of the multiple symbols.

18. The system of claim 15, wherein the background signal quality module is configured to update the running background signal quality measure with the symbol quality measure if the symbol quality measure is below the first threshold.

19. The system of claim 15, wherein the decision module is configured to determine an amount by which to downgrade the carrier quality measures based on an extent to which the symbol quality measure exceeds the first threshold.

20. The system of claim 19, wherein the decision module is configured to determine the amount on a linear scale.

21. The system of claim 19, wherein the decision module is configured to select one of multiple downgrade increments.

22. The system of claim 15, wherein the carrier quality measures include an estimated signal-to-noise ratio (SNR) for each data carrier, and wherein:
the decision module is configured to generate the first control to downgrade the SNRs of all data carriers in the symbol if the symbol quality measure exceeds the first threshold.

23. The system of claim 22, wherein the receiver includes:
a log-likelihood ratio (LLR) module to estimate log-likelihood ratios (LLR) for bits carried in constellation points of the data carriers, for multiple symbols, based on the corresponding SNRs;
a forward error correction (FEC) module to process the estimated LLRs; and
a module to downgrade the estimated SNRs of all data carriers in the symbol prior to the LLR module, based on the first control.

24. The system of claim 23, wherein the FEC module includes a low-density parity check (LDPC) module.

25. The system of claim 15, wherein the decision module is further configured to generate a second control to identify all data carriers in the symbol for erasure if the symbol quality measure exceeds a second threshold that varies with variations in the background signal quality measure, wherein the second threshold is higher than the first threshold.

26. The system of claim 25, wherein the receiver includes:
a log-likelihood ratio (LLR) module to estimate LLRs for bits carried in constellation points of the data carriers, for multiple symbols, based on the corresponding SNRs;
a forward error correction (FEC) module to process the estimated LLRs; and
a module to set estimated LLRs of identified data carriers to indicate that the identified data carriers are erased in the symbol, prior to the FEC module, based on the second control.

27. The system of claim 26, wherein the FEC module includes a low-density parity check (LDPC) module.

28. The system of claim 15, wherein the carrier quality measures include an estimated signal-to-noise ratio (SNR) for each data carrier, and wherein the decision module is further configured to:
generate the first control to downgrade the SNRs of all data carriers in the symbol if the corresponding symbol quality measure exceeds the first threshold; and
generate a second control to set estimated LLRs of all data carriers in the symbol to indicate that all of the data carriers are erased in the symbol if the corresponding symbol quality measure exceeds a second threshold that varies with variations in the background signal quality measure, wherein the second threshold is higher than the first threshold.

29. A non-transitory computer readable medium encoded with a computer program to mitigate impulse interference in quadrature amplitude modulated (QAM) carriers, wherein the computer program includes instructions to cause a processor to:

receive equalized samples of the QAM carriers from a receiver;

determine a symbol quality measure for a symbol based on equalized samples of at least one of the carriers in the symbol;

determine a running background signal quality measure based on symbol quality measures determined for multiple symbols;

generate a first control to downgrade a carrier quality measure of all data carriers in the symbol if the symbol quality measure exceeds a first threshold that varies with variations in the background signal quality measure; and provide the first control to the receiver.

30. The computer readable medium of claim 29, further including instructions to cause the processor to determine the symbol quality measure based on equalized samples of multiple carriers in the symbol.

31. The computer readable medium of claim 29, further including instructions to cause the processor to:

determine distances between carriers in the symbol and points of corresponding quadrature amplitude modulated constellations;

determine the symbol quality measure as a mean squared error of the distances; and determine the running background signal quality measure as an average of the symbol quality measures of the multiple symbols.

32. The computer readable medium of claim 29, further including instructions to cause the processor to update the running background signal quality measure with the symbol quality measure if the symbol quality measure is below the first threshold.

33. The computer readable medium of claim 29, further including instructions to cause the processor to determine an amount by which to downgrade the carrier quality measures based on an extent to which the symbol quality measure exceeds the first threshold.

34. The computer readable medium of claim 33, further including instructions to cause the processor to determine the amount on a linear scale.

35. The computer readable medium of claim 33, further including instructions to cause the processor to select one of multiple downgrade increments.

36. The computer readable medium of claim 29, wherein the carrier quality measures include an estimated signal-to-noise ratio (SNR) for each data carrier, further including instructions to cause the processor to:

generate the first control to downgrade the SNRs of all data carriers in the symbol if the symbol quality measure exceeds the first threshold.

37. The computer readable medium of claim 29, further including instructions to cause the processor to generate a second control to identify all data carriers in the symbol for erasure if the symbol quality measure exceeds a second threshold that varies with variations in the background signal quality measure, wherein the second threshold is higher than the first threshold.

38. The computer readable medium of claim 29, wherein the carrier quality measures include an estimated signal-to-noise ratio (SNR) for each data carrier, further including instructions to cause the processor to:

generate the first control to downgrade the SNRs of all data carriers in the symbol if the corresponding symbol quality measure exceeds the first threshold; and generate a second control to set estimated LLRs of all data carriers in the symbol to indicate that all of the data carriers are erased in the symbol if the corresponding symbol quality measure exceeds a second threshold that varies with variations in the background signal quality measure, wherein the second threshold is higher than the first threshold.

* * * * *